(12) United States Patent
Rueda

(10) Patent No.: US 11,560,760 B2
(45) Date of Patent: Jan. 24, 2023

(54) THREADED TUBULAR CONNECTION

(71) Applicant: Hydril Company, Houston, TX (US)

(72) Inventor: David Mutis Rueda, Houston, TX (US)

(73) Assignee: HYDRIL COMPANY, Houston, TX (US)

(*) Notice: Subject to any disclaimer, the term of this patent is extended or adjusted under 35 U.S.C. 154(b) by 64 days.

(21) Appl. No.: 15/749,400

(22) PCT Filed: Aug. 5, 2016

(86) PCT No.: PCT/US2016/045725
§ 371 (c)(1),
(2) Date: Jan. 31, 2018

(87) PCT Pub. No.: WO2017/024208
PCT Pub. Date: Feb. 9, 2017

(65) Prior Publication Data
US 2018/0223606 A1  Aug. 9, 2018

(30) Foreign Application Priority Data
Aug. 5, 2015 (EP) .................................. 15179857

(51) Int. Cl.
*F16L 15/06* (2006.01)
*E21B 17/042* (2006.01)
(Continued)

(52) U.S. Cl.
CPC ........ *E21B 17/0423* (2013.01); *E21B 17/042* (2013.01); *F16L 15/06* (2013.01); *F16L 15/002* (2013.01); *F16L 15/004* (2013.01)

(58) Field of Classification Search
None
See application file for complete search history.

(56) References Cited

U.S. PATENT DOCUMENTS 3,100,657 A   8/1963  Pistole
3,989,284 A   11/1976  Blose
(Continued)

FOREIGN PATENT DOCUMENTS

CN   1265445   9/2000
CN   1492980   4/2004
(Continued)

OTHER PUBLICATIONS

PCT International Search Report and Written Opinion of the International Searching Authority, PCT/US2016/045725, dated Oct. 26, 2016, 9 pages.
(Continued)

*Primary Examiner* — Matthew Troutman
*Assistant Examiner* — Douglas S Wood
(74) *Attorney, Agent, or Firm* — Morgan, Lewis & Bockius LLP

(57) ABSTRACT

A tubular connection comprising a longitudinal axis, a pin member comprising a distal pin end, a tapered pin thread having a constant pin taper angle $\alpha_1$ with respect to the longitudinal axis, and a pin sealing surface located between the pin thread and the distal pin end, and a box member comprising a distal box end, a box sealing surface, and a tapered box thread having a constant box taper angle $\beta_1$ with respect to the longitudinal axis and located between the box sealing surface and the distal box end, and wherein the pin thread is configured to cooperate by make up with the box thread along a cooperating area, while having a radial thread interference between the pin thread and the box thread along at least part of the cooperating area, the pin sealing surface and the box sealing surface are configured to contact each other upon make-up in a sealing manner while forming a metal to metal seal, and the pin taper angle $\alpha_1$ is larger than the box taper angle $\beta_1$.

36 Claims, 6 Drawing Sheets

(51) Int. Cl.
*F16L 15/04* (2006.01)
*F16L 15/00* (2006.01)

(56) References Cited

U.S. PATENT DOCUMENTS

| | | | |
|---|---|---|---|
| RE30,647 E | 6/1981 | Blose | |
| 4,703,954 A | 11/1987 | Ortloff et al. | |
| RE34,467 E | 12/1993 | Reeves | |
| 5,330,239 A * | 7/1994 | Blose | E21B 17/042 285/334.4 |
| 5,338,074 A * | 8/1994 | Barringer | F16L 15/004 285/334.4 |
| 5,360,239 A | 11/1994 | Klementich | |
| 5,388,074 A | 2/1995 | Buckenmaier | |
| 5,415,442 A * | 5/1995 | Klementich | F16L 15/004 29/237 |
| 5,454,605 A | 10/1995 | Mott | |
| 5,687,999 A | 11/1997 | Lancry et al. | |
| 6,009,611 A | 1/2000 | Adams et al. | |
| 6,174,000 B1 * | 1/2001 | Nishi | E21B 17/042 285/333 |
| 6,206,436 B1 | 3/2001 | Mallis | |
| 6,789,823 B2 | 9/2004 | Sches et al. | |
| 2002/0027363 A1 | 3/2002 | Mallis et al. | |
| 2002/0033603 A1 | 3/2002 | Pallini et al. | |
| 2003/0038476 A1 | 2/2003 | Galle | |
| 2003/0168858 A1 | 9/2003 | Hashem | |
| 2004/0104575 A1 | 6/2004 | Ellington | |
| 2006/0006600 A1 | 1/2006 | Rosie | |
| 2006/0087119 A1 | 4/2006 | Sivley et al. | |
| 2006/0145476 A1 | 7/2006 | Reynolds | |
| 2006/0145477 A1 | 7/2006 | Reynolds | |
| 2006/0145480 A1 * | 7/2006 | Mallis | F16L 15/004 285/390 |
| 2007/0158943 A1 | 7/2007 | Mallis | |
| 2007/0167051 A1 | 7/2007 | Reynolds | |
| 2008/0054633 A1 | 3/2008 | Reynolds | |
| 2009/0058085 A1 | 3/2009 | Breihan | |
| 2010/0123311 A1 | 5/2010 | Church | |
| 2011/0120278 A1 | 5/2011 | Ochiai | |
| 2012/0074690 A1 | 3/2012 | Mallis et al. | |
| 2014/0203556 A1 | 7/2014 | Besse et al. | |
| 2016/0160575 A1 | 6/2016 | Hou | |
| 2016/0195203 A1 * | 7/2016 | McElligott | F16L 15/04 285/390 |
| 2018/0223606 A1 | 1/2018 | Rueda | |
| 2018/0266593 A1 | 9/2018 | Glukhih | |
| 2019/0330292 A1 | 10/2019 | Breen et al. | |
| 2020/0024911 A1 | 1/2020 | Mutis Rueda | |

FOREIGN PATENT DOCUMENTS

| | | |
|---|---|---|
| CN | 1977124 | 6/2007 |
| CN | 101040141 | 9/2007 |
| CN | 101828062 | 9/2010 |
| CN | 104481422 | 4/2015 |
| CN | 104812989 | 7/2015 |
| EP | 0131621 | 9/1987 |
| EP | 0949441 | 10/1999 |
| EP | 2325435 | 5/2011 |
| JP | S 60500457 | 4/1985 |
| JP | S 61006488 | 1/1986 |
| JP | H 07-504483 A | 5/1995 |
| WO | WO200104520 | 1/2001 |
| WO | WO2015153271 | 10/2015 |

OTHER PUBLICATIONS

PCT International Preliminary Report of Patentability in International Application No. PCT/US2016/045725, dated Feb. 6, 2018, 6 pages.
U.S. Appl. No. 16/482,562, filed Jul. 31, 2019, Rueda et al.
U.S. Appl. No. 16/394,448, filed Apr. 25, 2019, Breen et al.
Extended European Search Report in European Appln. No. 15179857.6, dated Jan. 22, 2016, 7 pages.
Extended European Search Report in European Appln. No. 16833924.0, dated Feb. 28, 2019, 7 pages.

* cited by examiner

THREADED TUBULAR CONNECTION

CROSS-REFERENCE TO RELATED APPLICATIONS

This application is a U.S. National Phase application under U.S.C. § 371 and claims the benefit of priority to International Application No. PCT/US2016/045725, filed Aug. 5, 2016, which claims priority to European Patent Application No. EP15179857.6, filed Aug. 5, 2015, the contents of which are hereby incorporated by reference.

FIELD OF THE INVENTION

The invention relates to a threaded tubular connection for use in the hydrocarbon industry. It is conventional to connect tubes by make-up, said tubes being intended to constitute a casing or a tubing string in the context of exploration, operating and/or production of hydrocarbon wells.

The tubular connection comprises a longitudinal axis, a pin member (often also referred to as male member) and a box member (often also referred to as female member). The pin member comprises a distal pin end, a tapered pin thread having a pin taper angle $\alpha$ with respect to the longitudinal axis, and a pin sealing surface located between the pin thread and the distal pin end. The box member comprises a distal box end, a box sealing surface, and a tapered box thread having a box taper angle $\beta$ with respect to the longitudinal axis and located between the box sealing surface and the distal box end. The pin thread is configured to cooperate by make up with the box thread along a cooperating area, while having a radial thread interference between the pin thread and the box thread along at least part of the cooperating area. The pin sealing surface and the box sealing surface are configured to contact each other upon make-up in a sealing manner while forming a metal to metal seal.

BACKGROUND OF THE INVENTION

Radial thread interference is provided when the male thread pitch diameter (male thread basic diameter) is larger than the female thread pitch diameter (female thread basic diameter). As a result of this, the pin and box threads will come closer in contact with each other during make up. After the make up is completed, the pin and box threads exert a radial force on each other. Said radial force forms the radial thread interference.

In the known threaded connections, the radial thread interference ensures a proper stress distribution between the pin member and the box member. However, the radial thread interference can cause excessive stresses at the metal to metal seal. In said situation, the contact bearing stresses at the pin sealing surface and the box sealing surface can damage the metal to metal seal. It can cause galling or may yield the material of the connection such that the metal to metal seal does not function reliably under repeated makeup and breakout.

In an attempt to solve this problem, U.S. Pat. No. 5,338,074 provides a tubular connection with a tapered thread extending under a constant taper angle $\alpha$ on one of the pin or box member and another tapered thread with a first part extending under a taper angle $\beta_1$ and a second part extending under a different taper angle $\beta_2$ on the other of the pin or box member. The constant taper angle $\alpha$ is equal to the taper angle $\beta_1$ of the first part. The second part is located adjacent to the metal to metal seal and has a steeper taper angle $\beta_2$ than the taper angle $\beta_1$ of the first part. This is done to provide clearance between the threads of the pin and box member located adjacent to the sealing surfaces, in order to reach a better distribution of the forces over the pin and box sealing surfaces.

U.S. Pat. No. 5,338,074 has the drawback that detrimental stress concentrations arise in the tubular connection.

The invention is amongst others based on the insight that the sudden change from the taper angle $\beta_1$ of the first part into the steeper taper angle $\beta_2$ of the second part caused a detrimental stress concentration in the tubular connection, more specifically at the critical cross section located at the last engaged tooth of the box thread. This problem is in particular relevant in short threads, that is to say threads with for example less than 7 pitches (also referred to as revolutions of thread), since the change in taper has is said situation to be aggressive enough to generate the desired interference relief in the direction in which the taper diverges.

In addition, it was recognised that when the change in taper as described in U.S. Pat. No. 5,338,074 is applied in short threads (for example threads with less than 7 pitches) this would also pose a control problem, because the precision of the measurement would be compromised by controlling the taper over one or two pitches only. When the thread is short, as e.g. in two step threads or one step with less than 7 pitches, the number of pitches is not sufficient to ensure a proper transition between the initial and final taper.

In other words, in threaded connections like the one described in U.S. Pat. No. 5,338,074 (having a thread with two sections having different tapers) it is not possible to control both tapered sections of the thread with the same accuracy, mainly because taper control is more precise when measured over a larger number of pitches.

In the situation that the tapered thread has for example in total seven pitches of thread and the first tapered part has five pitches of thread, the second tapered part will only have two pitches of thread. The accuracy of the measurement of the taper increases when said measurement is performed along an increasing number of pitches of thread. If the thread has a low number of pitches, the measurement of the thread will not be accurate. This means that the second tapered part cannot be controlled with at least the same accuracy as the first tapered part

SUMMARY OF THE INVENTION

The invention has the objective to provide an improved tubular connection in view of U.S. Pat. No. 5,338,074. This is provided by a tubular connection comprising a longitudinal axis, a pin member comprising a distal pin end, a tapered pin thread having a constant pin taper angle $\alpha_1$ with respect to the longitudinal axis, and a pin sealing surface located between the pin thread and the distal pin end, and a box member comprising a distal box end, a box sealing surface, and a tapered box thread having a constant box taper angle $\beta_1$ with respect to the longitudinal axis and located between the box sealing surface and the distal box end, and wherein the pin thread is configured to cooperate by make up with the box thread along a cooperating area, while having a radial thread interference between the pin thread and the box thread along at least part of the cooperating area, the pin sealing surface and the box sealing surface are configured to contact each other upon make-up in a sealing manner while forming a metal to metal seal, and the pin taper angle $\alpha_1$ is larger than the box taper angle $\beta_1$.

Since the pin taper angle $\alpha_1$ is constant along the complete pin thread, the box taper angle $\beta_1$ is constant along the complete box thread, and the pin taper angle $\alpha_1$ is larger than the box taper angle $\beta_1$, the radial thread interference can be reduced adjacent to the metal to metal seal while avoiding a sudden change in the pin taper angle $\alpha_1$. This way, the risk for a detrimental stress concentration in the tubular connection, more specifically at the critical cross section located at the last engaged tooth of the box thread, is reduced. In addition, the pitches of the entire thread are available to control the accuracy of the thread.

Additionally, it has been found that embodiments of this invention will provide enhancements in the sealability performance of threaded connections with metal to metal seals.

In the case of interference seals, the main objective of the diverging taper is to reduce the thread interference near the metal to metal seal to reduce the push-off and increase the effective seal interference.

In an interference seal, the main sealing mechanism is due to the effective seal interference. In other words, metal to metal seals being used as an interference seal rely on the effective seal interference to generate appropriate contact stresses. When the threaded connection is in use, an increase of the internal pressure has a relatively small effect on the effective seal interference.

The effective seal interference is defined as the seal interference minus the thread interference adjacent to the seal.

So the reduction of the thread interference near the metal to metal seal due to the diverging tapers generates an increase in the effective sealing pressure and thus enhanced sealability.

In the case of pressure energized seals, the main objective of the diverging taper is to create clearance near the metal to metal seal allowing the pin seal to be energized with pressure, that is to flex outwards, which increases the contact pressure between mating sealing surfaces.

Pressure energized seals are seals in which the seal mechanism is generated by the increase in contact pressure due to internal pressure. In other words, the rate of increase of contact pressure as internal pressure is applied is higher when compared with an interference seal.

Pressure energized seals need some flexibility where the seal is machined in order to allow the correct energizing of the seal (e.g. the pin nose seal has to flex outwards due to internal pressure in order to increase the seal contact pressure).

In the case of pressure energized seals an adequate value of clearance is achieved near the seal to increase flexibility and allow the proper energizing of the seal as described.

The pin taper angle $\alpha_1$ is measured along the pin pitch diameter of the pin thread and the box taper angle $\beta_1$ is measured along the box pitch diameter of the box thread.

The radial thread interference decreases gradually and continuously along the cooperating pin thread and box thread in a direction towards the pin sealing surface and the box sealing surface.

Embodiments of the tubular connection according to the invention will be described below. The tubular connection according the invention can also have any combination of the features of any number of the below described embodiments.

It was found out that the negative effect of the stress concentration in the tubular connection was further reduced when the tapered form of the pin and box threads complied to specific characteristics.

In an embodiment of the tubular connection, the pin taper angle $\alpha_1$ is between, and including, 1.4°-5° with respect to the longitudinal axis.

In an embodiment of the tubular connection, the box taper angle $\beta_1$ is between, and including, 1.4°-5° with respect to the longitudinal axis.

It is well known in the art that the taper angle for the pin and box can also be indicated as the diametrical taper, being the diametrical variance of the pitch diameter of the pin or box thread per revolution of the thread.

In an embodiment of the tubular connection, the diametrical pin taper is between, and including, 0.356-2.286 mm/revolution (0.014-0.090 inch/revolution).

In an embodiment of the tubular connection, the diametrical box taper is between, and including, 0.356-2.286 mm/revolution (0.014-0.090 inch/revolution).

In an embodiment of the tubular connection, the diametrical pin taper is between, and including, 0.0127-0.0381 mm/revolution (0.0005-0.0015 inch/revolution) larger than the diametrical box taper.

In an embodiment of the tubular connection, the pin thread and the box thread have the same pitch (mm/revolution or inch/revolution). The pitch is the axial displacement per revolution along the thread.

In an embodiment of the tubular connection, the pitch of the pin thread and the box thread falls is between, and including, 6.883-13.081 mm/revolution (0.271-0.515 inch/revolution).

In an embodiment of the tubular connection, the pin thread and the box thread engage each other at the end of make-up along the cooperating area and the radial thread interference between the pin thread and the box thread is present along the complete cooperating area. This embodiment is amongst others very suitable for when the metal to metal seal formed by the pin sealing surface and the box sealing surface is an interference seal.

In an embodiment of the tubular connection, the pin thread and the box thread engage each other at the end of make-up along the cooperating area, the radial thread interference between the pin thread and the box thread is present along a first part of the cooperating area, there is a clearance between the pin thread and the box thread along a second part of the cooperating area, and the second part of the cooperating area is located closer to the pin sealing surface and the box sealing surface than the first part of the cooperating area. The clearance between the pin thread and the box thread increases in the direction towards the pin sealing surface and the box sealing surface. This embodiment is amongst others very suitable for when the metal to metal seal formed by the pin sealing surface and the box sealing surface is a pressure energised seal.

In an embodiment of the tubular connection, the pin thread and the box thread are the only threads provided on the pin member and the box member, respectively. This embodiment of the tubular connection has a single step thread.

In an embodiment of the tubular connection, the pin member comprises a further tapered pin thread having a further constant pin taper angle $\alpha_2$ with respect to the longitudinal axis and located at a distance from the pin thread, the box member comprises a further tapered box thread having a further constant box taper angle $\beta_2$ with respect to the longitudinal axis and located at a distance from the box thread, the further pin thread is configured to cooperate by make up with the further box thread along a further cooperating area, while having a further radial thread interference between the further pin thread and the further box thread along at least part of the further cooperating area.

This embodiment of the tubular connection has a two step thread. The tubular connection may comprise a configuration wherein:
the pin thread is located closer to the distal pin end than the further pin thread, and the further box thread is located closer to the distal box end than the box thread, or
the further pin thread is located closer to the distal pin end than the pin thread, and the box thread is located closer to the distal box end than the further box thread.

In an embodiment of the tubular connection, the pin member comprises a further tapered pin thread having a further constant pin taper angle $\alpha_2$ with respect to the longitudinal axis and located at a distance from the pin thread, the pin member is provided with a further pin sealing surface located between the further pin thread and the distal pin end, the box member comprises a further tapered box thread having a further constant box taper angle $\beta_2$ with respect to the longitudinal axis and located at a distance from the box thread, the box member is provided with a further box sealing surface, the further box thread is located between the further box sealing surface and the distal box end, the further pin thread is configured to cooperate by make up with the further box thread along a further cooperating area, while having a further radial thread interference between the further pin thread and the further box thread along at least part of the further cooperating area, and the further pin sealing surface and the further box sealing surface are configured to contact each other upon make up in a sealing manner while forming a further metal to metal seal. This embodiment of the tubular connection has a two step thread and two metal to metal seals. The tubular connection may comprise a configuration wherein:
the pin thread and the pin sealing surface are located closer to the distal pin end than the further pin thread and the further pin sealing surface, and the further box thread and the further box sealing surface are located closer to the distal box end than the box thread and the box sealing surface, or
the further pin thread and the further pin sealing surface are located closer to the distal pin end than the pin thread and the pin sealing surface, and the box thread and the box sealing surface are located closer to the distal box end than the further box thread and the further box sealing surface.

In an embodiment of the tubular connection, the further pin taper angle is equal to the further box taper angle, or the further pin taper angle is larger than the further box taper angle.

In an embodiment of the tubular connection, the pin thread is a pin wedge thread having pin teeth increasing in width in a first direction along the longitudinal axis, and the box thread is a box wedge thread having box teeth increasing in width in an opposite second direction along the longitudinal axis.

In an embodiment of the tubular connection, each of the pin thread and the further pin thread is a pin wedge thread having pin teeth and further pin teeth, respectively, each of the pin teeth and further pin teeth are increasing in width in a first direction along the longitudinal axis, each of the box thread and the further box thread is a box wedge thread having box teeth, and further box teeth, respectively, each of the box teeth and further box teeth are increasing in width in an opposite second direction along the longitudinal axis.

In an embodiment of the tubular connection, each of the pin thread and the box thread has a dovetail-shaped thread profile.

In an embodiment of the tubular connection, each of the pin thread, the further pin thread, the box thread and the further box thread has a dovetail-shaped thread profile.

It is remarked that embodiments of this invention having wedge threads with dovetail profile generate and additional enhancement of the sealability of the connection. Diverging tapers also allow the box threads to gradually pull the pin threads in the radial direction as they near the pin nose seal, enhancing the sealing performance (increasing seal contact pressure) of the metal to metal seal.

In an embodiment of the tubular connection, the pin member is free from threads between the pin thread and the pin sealing surface and the box member is free from threads between the box thread and the box sealing surface.

In an embodiment of the tubular connection, the pin member is free from threads between the pin sealing surface and the distal pin end and the box member is in a direction along the longitudinal axis from the distal box end to the box sealing surface free from threads beyond the box sealing surface.

In an embodiment of the tubular connection, the pin thread has pin teeth and the box thread has box teeth, and the height of the pin teeth and the box teeth is constant along the cooperating area.

In an embodiment of the tubular connection, the further pin thread has further pin teeth, the further box thread has further box teeth, and the height of the further pin teeth and the further box teeth is constant along the further cooperating area.

In an embodiment of the tubular connection, the metal to metal seal is a pressure energised seal.

In an embodiment of the tubular connection, the metal to metal seal is an interference seal.

In an embodiment of the tubular connection, the further metal to metal seal is a pressure energised seal.

In an embodiment of the tubular connection, the further metal to metal seal is an interference seal.

In an embodiment of the tubular connection, the distal pin end of the pin member is free from contact with the box member in a direction along the longitudinal axis.

In an embodiment of the tubular connection, the distal box end of the box member is free from contact with the pin member in a direction along the longitudinal axis.

In an embodiment of the tubular connection, wherein the pin thread and the box thread have less than 7 revolutions of thread.

In an embodiment of the tubular connection, the further pin thread and the further box thread have less than 7 revolutions of thread.

The invention further relates to a threaded tubular connection comprising a longitudinal axis, a pin member comprising a distal pin end, a tapered pin thread having a constant pin taper angle $\alpha1$ with respect to the longitudinal axis, and a pin sealing surface located between the pin thread and the distal pin end, and a box member comprising a distal box end, a box sealing surface, and a tapered box thread having a constant box taper angle $\beta1$ with respect to the longitudinal axis and located between the box sealing surface and the distal box end, wherein the pin thread cooperates with the box thread along a cooperating area, a radial thread interference between the pin thread and the box thread is present along at least part of the cooperating area, the pin sealing surface and the box sealing surface are in contact with each other in a sealing manner to form a metal to metal seal, and the pin taper angle is larger than the box taper angle. The tubular connection according the invention can also have any combination of the features of any number of the above described embodiments.

BRIEF DESCRIPTION OF THE DRAWINGS

Embodiments of the tubular connection according to the invention will be described by way of example only, with reference to the accompanying schematic drawings in which corresponding reference symbols indicate corresponding parts, and in which.

DETAILED DESCRIPTION OF THE DRAWINGS

Figure 1:
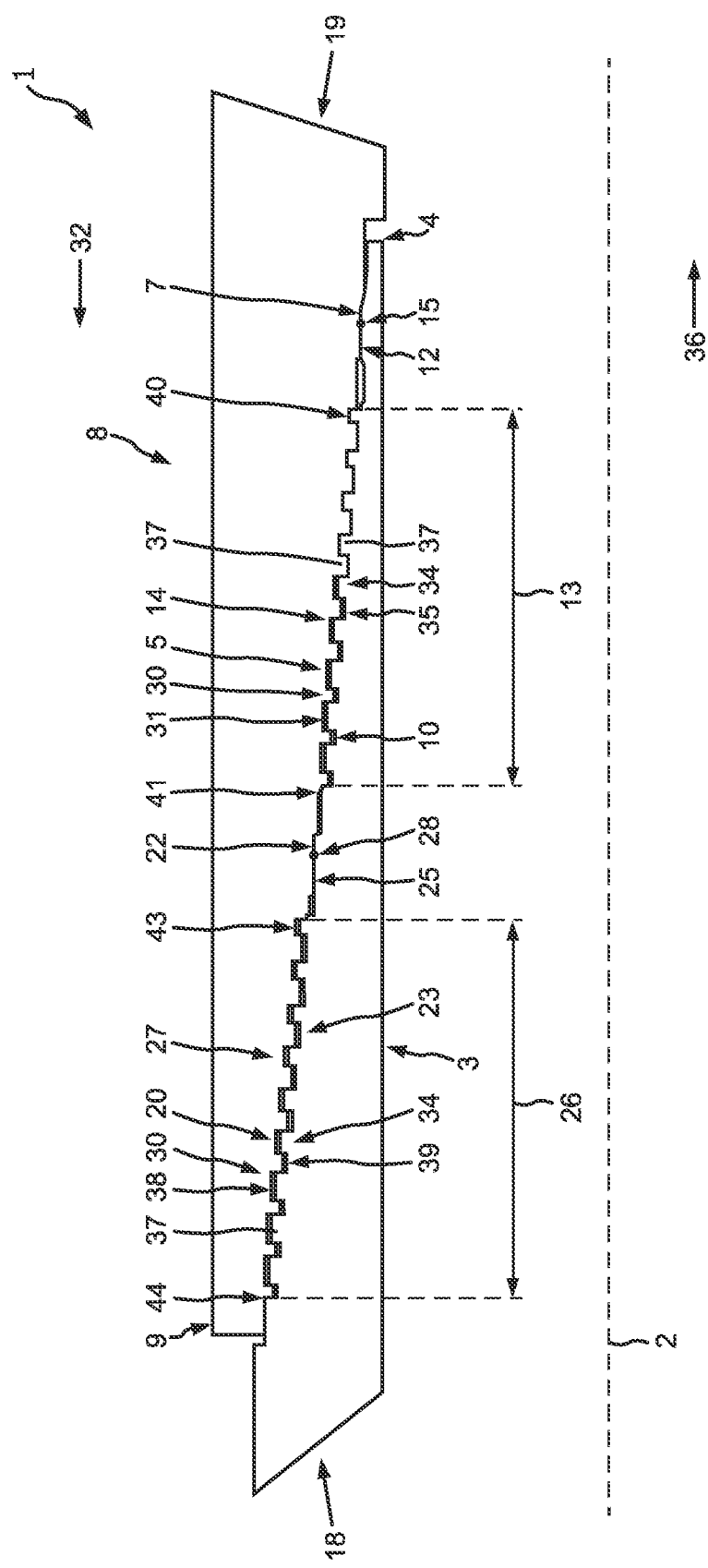
FIG. 1 schematically shows a view in cross section of an embodiment of the tubular connection according to the invention, FIG. 2 schematically shows a representation of the pin pitch diameter of the pin thread and the box pitch diameter of the box thread of the tubular connection of FIG. 1, FIG. 3 schematically shows a representation of the further pin pitch diameter of the further pin thread and the further box pitch diameter of the further box thread of the tubular connection of FIG. 1, FIG. 4 schematically shows a representation of the pin pitch diameter of the pin thread and the box pitch diameter of the box thread of an alternative embodiment of the tubular connection according to the invention, FIG. 5 schematically shows a representation of the pin pitch diameter of the pin thread and the box pitch diameter of the box thread of a tubular connection known from the prior art, and FIG. 6 schematically shows a view in cross section of a further embodiment of the tubular connection according to the invention.

FIG. 1 shows a view in cross section of an embodiment of the tubular connection 1 according to the invention. The tubular connection 1 comprises a longitudinal axis 2, a pin member 3 and a box member 8. Only part of the tubular connection 1 is shown. The tubular connection 1 surrounds the longitudinal axis 2. The pin member 3 is connected to a first tube 18 and the box member to a second tube 19. By interconnecting the first and second tubes 18 and 19 via the pin and box members 3 and 8, a string of two tubes is formed.

The pin member 3 comprises a distal pin end 4, a tapered pin thread 5 having a constant pin taper angle $\alpha_1$ with respect to the longitudinal axis 2, and a pin sealing surface 7 10 located between the pin thread 5 and the distal pin end 4. The box member 8 comprises a distal box end 9, a box sealing surface 12, and a tapered box thread 10 having a constant box taper angle $\beta_1$ with respect to the longitudinal axis 2 and located between the box sealing surface 12 and the distal box end 9.

The pin thread 5 is configured to cooperate by make up with the box thread 10 along a cooperating area 13. FIG. 1 shows the tubular connection 1 after the make up has been completed. The pin thread 5 and the box thread 10 engage each other along the cooperating area 13. When seen in the direction from the distal pin end 4 to the distal box end 9, the cooperating area 13 extends along the pin thread 5 and the box thread 10 from a starting point 40 until an end point 41. There is a radial thread interference 14 between the pin thread 5 and the box thread 10 along at least part of the cooperating area 13. The pin taper angle $\alpha_1$ is larger than the box taper angle $\beta_1$.

In FIG. 1, as will be explained in relation to FIG. 2, the radial thread interference 14 is present along the complete cooperating area 13. As common in this technical field, the radial thread interference 14 is in FIG. 1 indicated by an exaggerated overlap between the crests and roots of the teeth of the pin thread 5 and the box thread 10. The degree of overlap indicates the degree of radial thread interference 14 between the pin thread 5 and the box thread 10. The person skilled in the art will understand that this is just a way of representing schematically the interference and that (as defined in the description) there can be radial interference between the pin and box threads without crest to root interference. In other words, the value of the interference is independent from the type of contact (e.g. crest to root, flank to flank, full contact). The radial thread interference 14 decreases gradually and continuously along the cooperating pin thread 5 and box thread 10 in a direction towards the pin sealing surface 7 and the box sealing surface 12. The radial thread interference 14 reaches a maximum at the end point 41 of the cooperating area 13 and a minimum at the starting point 40.

The pin sealing surface 7 and the box sealing surface 12 are configured to contact each other upon make-up in a sealing manner while forming a metal to metal seal 15. The metal to metal seal 15 is a pressure energised seal. In another embodiment, the metal to metal seal 15 is an interference seal.

Since the pin taper angle $\alpha_1$ is constant along the complete pin thread 5, the box taper angle $\beta_1$ is constant along the complete box thread 10, and the pin taper angle $\alpha_1$ is larger than the box taper angle $\beta_1$, the radial thread interference 14 can be reduced adjacent to the metal to metal seal 15 while avoiding a sudden change in the pin taper angle $\alpha_1$ and the box taper angle $\beta_1$ and keeping the angular difference between the box taper angle $\beta_1$ and the pin taper angle $\alpha1$ at a minimum. This way, the risk for a detrimental stress concentration in the tubular connection 1 is minimised, while the functioning of the metal and metal seal 15 is optimised.

The tubular connection 1 of FIG. 1 has a two step thread with two metal to metal seals 15 and 28. The pin member 3 comprises a further tapered pin thread 20 having a further constant pin taper angle $\alpha_2$ with respect to the longitudinal axis 2 and located at a distance from the pin thread 5. The pin member 3 is provided with a further pin sealing surface 22 located between the further pin thread 20 and the distal pin end 4. The box member 8 comprises a further tapered box thread 23 having a further constant box taper angle $\beta_2$ with respect to the longitudinal axis 2 and located at a distance from the box thread 10. The box member 8 is provided with a further box sealing surface 25. The further box thread 23 is located between the further box sealing surface 25 and the distal box end 9.

The further pin thread 20 is configured to cooperate by make up with the further box thread 23 along a further cooperating area 26. When seen in the direction from the distal pin end 4 to the distal box end 9, the further cooperating area 26 extends along the further pin thread 20 and the further box thread 23 from a further starting point 43 until a further end point 44. There is a further radial thread interference 27 between the further pin thread 20 and the further box thread 23 along at least part of the further cooperating area 26. In FIG. 1, as will be explained in relation to FIG. 3, the further radial thread interference 27 is present along the complete further cooperating area 26. The further radial thread interference 27 is constant along the further cooperating area 26. The further pin taper angle $\alpha_2$ is equal to the further box taper angle $\beta_2$.

In an alternative embodiment of the tubular connection 1, the further pin taper angle $\alpha_2$ is larger than the further box taper angle $\beta_2$. In said situation, the further radial thread interference 27 decreases gradually and continuously along the cooperating further pin thread 20 and further box thread 23 in a direction along the longitudinal axis 2 and towards the further pin sealing surface 22 and the further box sealing surface 25.

The further pin sealing surface 22 and the further box sealing surface 25 are configured to contact each other upon make up in a sealing manner while forming a further metal to metal seal 28. The further metal to metal seal 28 is an interference seal. In another embodiment, the further metal to metal seal 28 is a pressure energised seal.

The pin thread 5 and the pin sealing surface 7 are located closer to the distal pin end 4 than the further pin thread 20 and the further pin sealing surface 22, and the further box thread 23 and the further box sealing surface 25 are located closer to the distal box end 9 than the box thread 10 and the box sealing surface 12. The further pin and box thread 20, 23 retain the energy in the tubular connection 1, and the pin and box thread 5, 10 optimise the performance of the metal to metal seal 15.

In an alternative embodiment of the tubular connection 1, the further pin thread 20 and the further pin sealing surface 22 are located closer to the distal pin end 4 than the pin thread 5 and the pin sealing surface 7, and the box thread 10 and the box sealing surface 12 are located closer to the distal box end 9 than the further box thread 23 and the further box sealing surface 25.

Each of the pin thread 5 and the further pin thread 20 is a pin wedge thread 30 having pin teeth 31 and further pin teeth 38, respectively, each of the pin teeth 31 and further pin teeth 38 are increasing in width in a first direction 32 along the longitudinal axis 2, each of the box thread 10 and the further box thread 23 is a box wedge thread 34 having box teeth 35 and further box teeth 39, respectively, and each of the box teeth 35 and further box teeth 39 are increasing in width in an opposite second direction 36 along the longitudinal axis 2. In an alternative embodiment of the tubular connection 1, the width of the pin and box teeth 31, 35 of the pin and box threads 5, 10 and/or the width of the further pin and further box teeth 38, 39 of the further pin and further box threads 20, 23 remain constant in the first direction 32 along the longitudinal axis 2.

Each of the pin thread 5, the further pin thread 20, the box thread 10 and the further box thread 23 has a dovetail-shaped thread profile 37. In an alternative embodiment of the tubular connection, the pin and box threads 5 and 10 and/or the further pin and further box threads 20 and 23 have a different form, such as general trapezoidal threads, buttress threads, buttress modified threads, hook threads and triangular threads.

In an alternative embodiment, the pin thread 5 and the box thread 10 have less than 7 revolutions of thread.

In an alternative embodiment, the further pin thread 20 and the further box thread 23 have less than 7 revolutions of thread.

Figure 2:
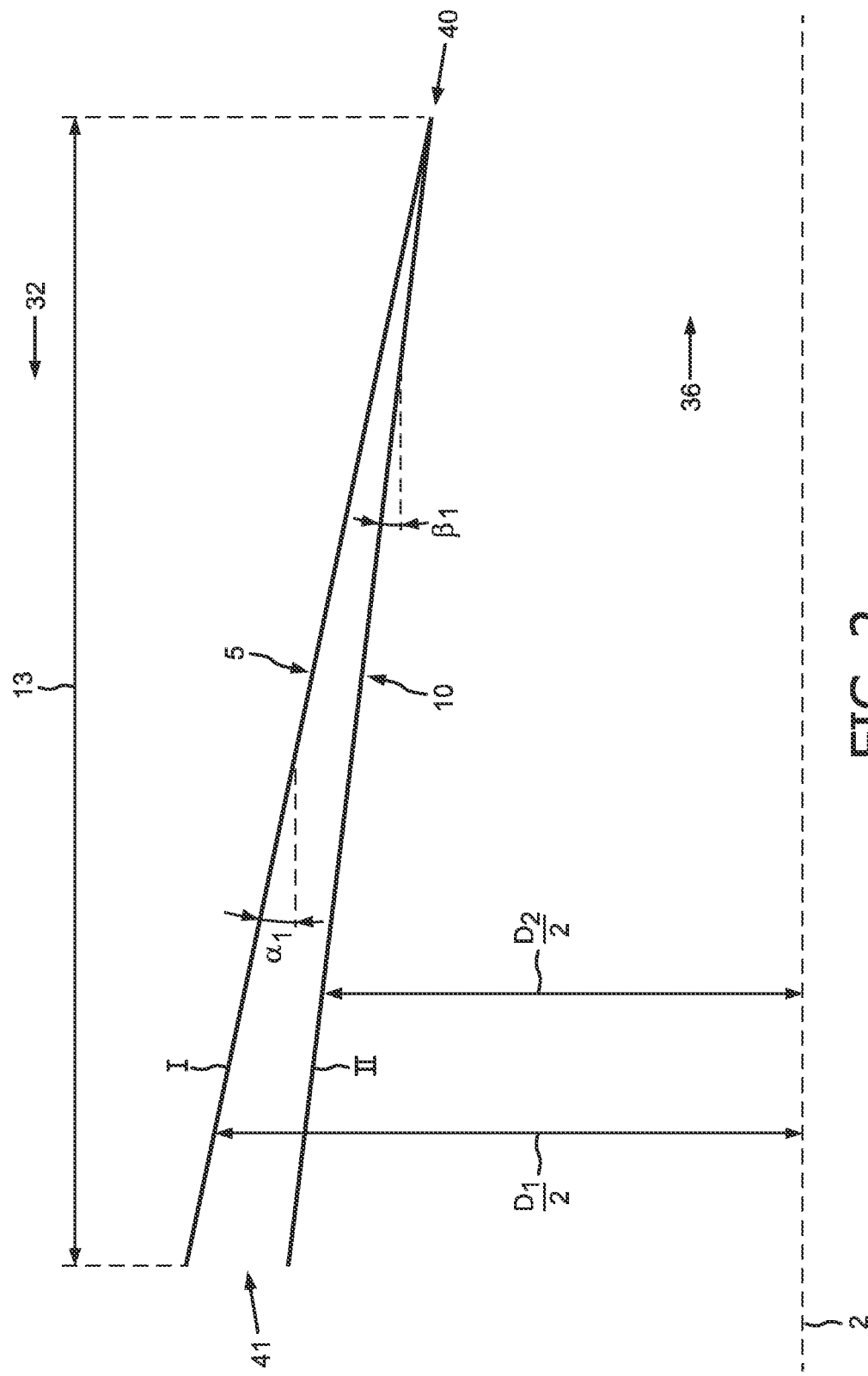

FIG. 2 shows a representation of the pin pitch diameter $D_1$ of the pin thread 5 and the box pitch diameter $D_2$ of the box thread 10 of the tubular connection 1 of FIG. 1. FIG. 2 represents a cross sectional view similar to the one of FIG. 1. The pin pitch diameter $D_1$ and the box pitch diameter $D_2$ are indicated with respect the longitudinal axis 2.

Line I shows the variance of the pin pitch diameter $D_1$ along the longitudinal axis 2. Line II shows the variance of the box pitch diameter $D_2$ along the longitudinal axis 2. The pin taper angle $\alpha_1$ is the angle between the line of the pin pitch diameter $D_1$ and the longitudinal axis 2. The box taper angle $\beta_1$ is the angle between the line II of the box pitch diameter $D_2$ and the longitudinal axis 2.

Radial thread interference 14 is present at the locations where the pin pitch diameter $D_1$ is larger than the box pitch diameter $D_2$. The radial thread interference 14 reaches a maximum at the end point 41 of the cooperating area 13 and is zero at the starting point 40.

To determine the pin taper angle $\alpha_1$ and the box taper angle $\beta_1$, one can measure on the pin member 3 and the box member 8 the diametrical taper, which is the variance of the pitch diameter of the thread per revolution along the thread, and the pitch, which is the displacement in axial direction per revolution along the thread. Subsequently, the taper angle can be calculated according to:

$$\text{Tan (taper angle)} = \frac{0{,}5 \cdot (\text{diametrical taper})}{(\text{pitch})}$$

Figure 3:
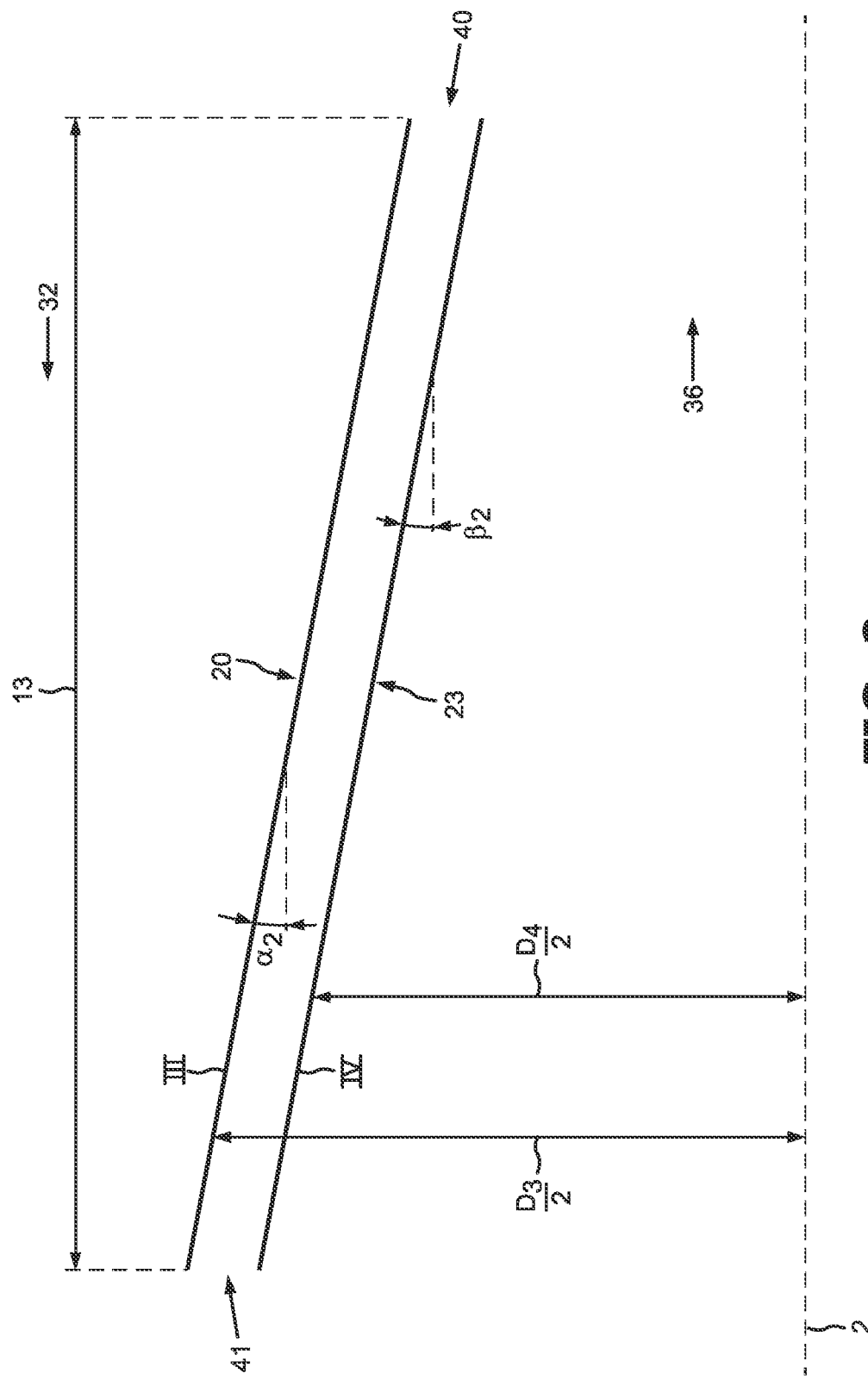

FIG. 3 shows a representation of the further pin pitch diameter $D_3$ of the further pin thread 20 and the further box pitch diameter $D_4$ of the further box thread of the tubular connection 1 of FIG. 1. FIG. 3 is a similar view as FIG. 2. The further pin pitch diameter $D_3$ and the further box pitch diameter $D_4$ are indicated with respect the longitudinal axis 2.

Line III shows the variance of the further pin pitch diameter $D_3$ along the longitudinal axis 2. Line IV shows the variance of the further box pitch diameter $D_4$ along the longitudinal axis 2. The further pin taper angle $\alpha_2$ is the angle between the line III of the further pin pitch diameter $D_3$ and the longitudinal axis 2. The box taper angle $\beta_2$ is the angle between the line IV of the further box pitch diameter $D_4$ and the longitudinal axis 2.

The further radial thread interference 27 is present at the locations where the further pin pitch diameter $D_3$ is larger than the further box pitch diameter $D_4$. The further radial thread interference 27 is constant from the further end point 44 of the further cooperating area 26 until the further starting point 43.

Figure 4:
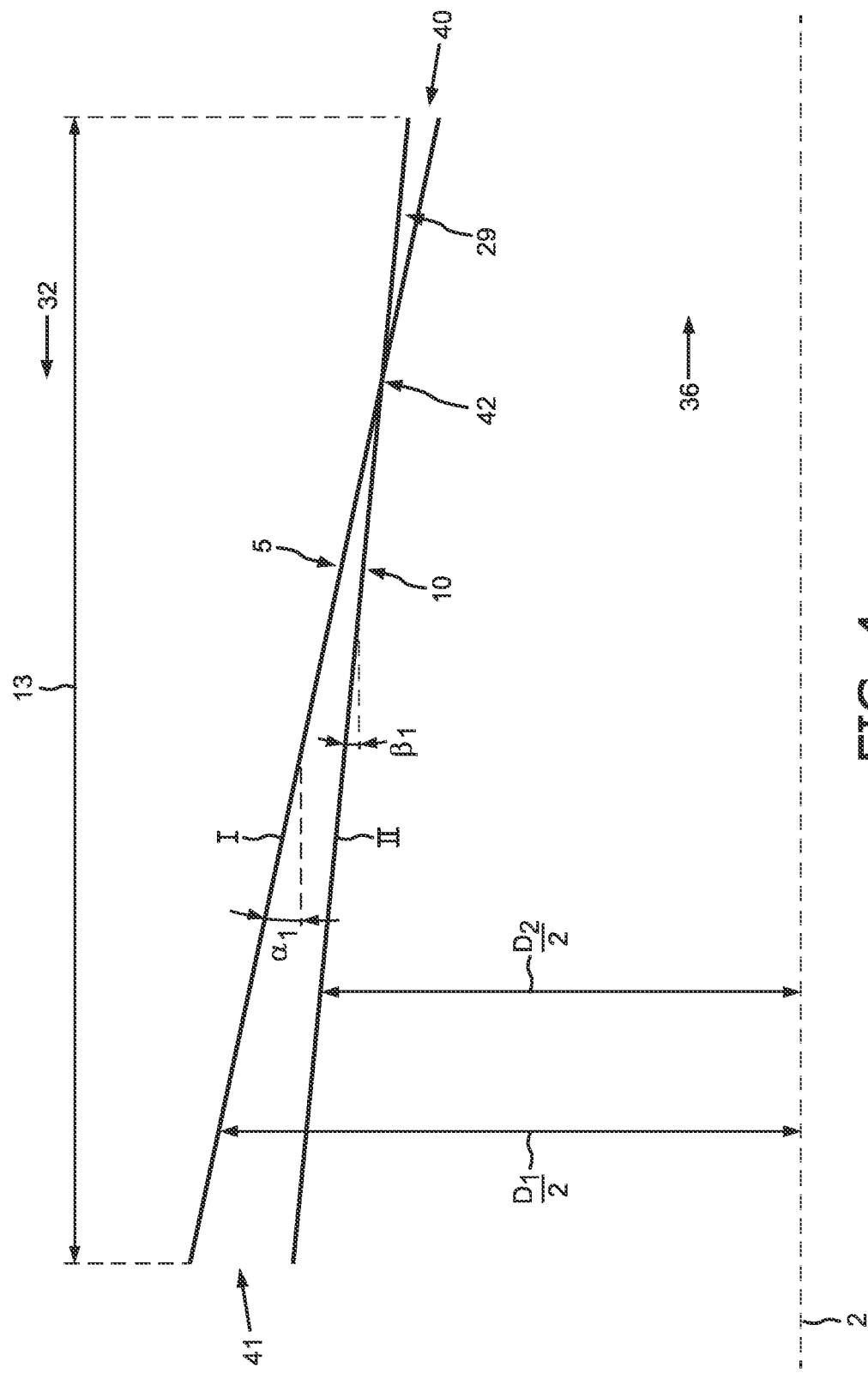

FIG. 4 shows a representation of the pin pitch diameter $D_1$ of the pin thread 5 and the box pitch diameter $D_2$ of the box thread 10 of an alternative embodiment of the tubular connection 1 according to the invention. FIG. 4 is a similar view as FIG. 2.

The pin thread 5 and the box thread 10 engage each other along the cooperating area 13. The radial thread interference 14 between the pin thread and the box thread is present along a first part 16 of the cooperating area 13. The radial thread interference 14 reaches a maximum at the end point 41 of the cooperating area 13 and is zero at an intermediated point 42. The intermediate point 42 is located between the starting point 40 and the end point 41 of the cooperating area 13. There is a clearance 29 between the pin thread 5 and the box 10 thread along a second part 17 of the cooperating area 13 extending from the intermediate point 42 until the starting point 40.

The second part 17 of the cooperating area 13 is located closer to the pin sealing surface 7 and the box sealing surface 12 than the first part 16 of the cooperating area 13. The clearance 29 between the pin thread 5 and the box thread 10 increases in the direction towards the pin sealing surface 7 and the box sealing surface 12. This is amongst others very suitable for when the metal to metal seal 15 formed by the pin sealing surface 7 and the box 10 sealing surface 12 is a pressure energised seal, in particular when wedge threads are used, such as wedge threads with a dovetail-shaped thread profile.

Figure 5:
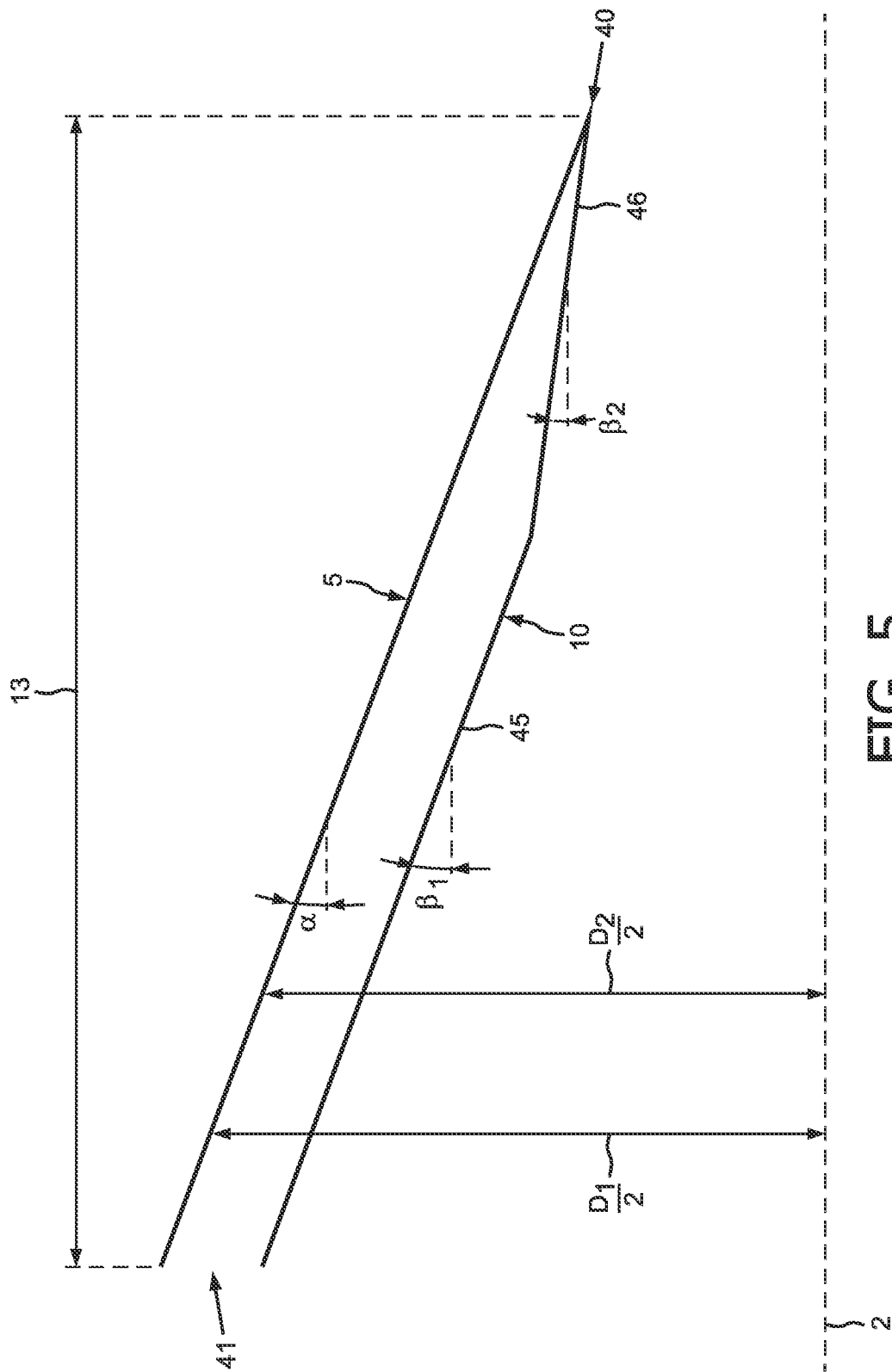

FIG. 5 shows a representation of the pin pitch diameter $D_1$ of the pin thread 5 and the box pitch diameter $D_2$ of the box thread 10 of a tubular connection 1 known from the prior art, more specifically U.S. Pat. No. 5,338,074. FIG. 5 is a similar view as FIG. 2. The tubular connection 1 has a tapered pin thread 5 with a constant taper angle α on the pin member 3. The box member 8 has a tapered box thread 10 with a first thread part 45 having a taper angle $β_1$ and a second thread part 46 having a different taper angle $β_2$. The constant taper angle α is equal to the taper angle $β_1$ of the first thread part 45. The second thread part 46 is located adjacent to the metal to metal seal 15 and has a steeper taper angle $β_2$ than the taper angle $β_1$ of the first thread part 45.

Figure 6:
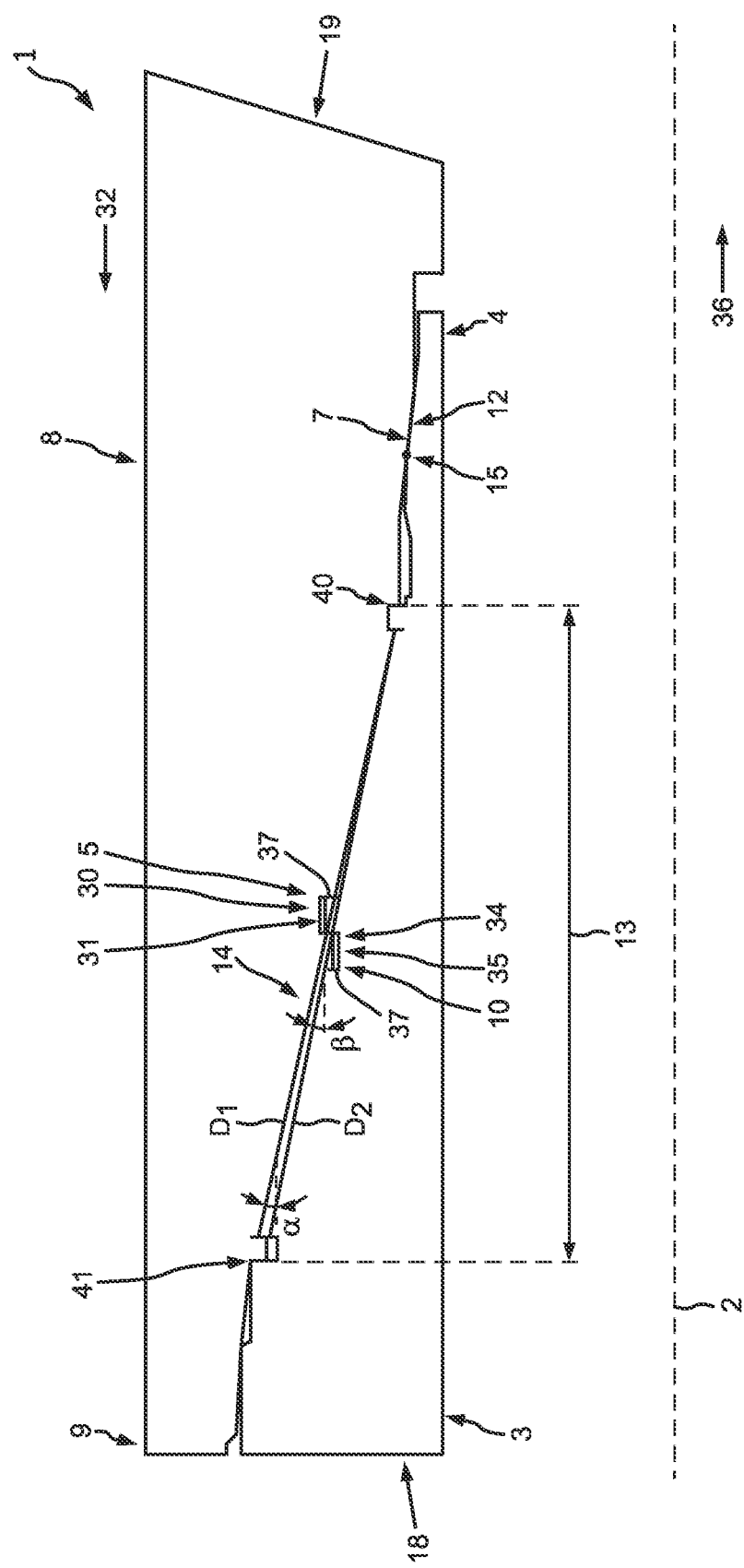

FIG. 6 schematically shows a view in cross section of a further embodiment of the tubular connection 1 according to the invention. The tubular connection 1 has a single step thread. The tubular connection comprises a longitudinal axis 2, a pin member 3 and a box member 8.

The pin member 3 comprises a distal pin end 4, a tapered pin thread 5 having a constant pin taper angle α with respect to the longitudinal axis 2, and a pin sealing surface 7 located between the pin thread 5 and the distal pin end 4. The box member 8 comprises a distal box end 9, a box sealing surface 12, and a tapered box thread 10 having a constant box taper angle β with respect to the longitudinal axis 2 and located between the box sealing surface 12 and the distal box end 9.

The pin thread 5 is configured to cooperate by make up with the box thread 10 along a cooperating area 13. FIG. 6 shows the tubular connection 1 after the make up has been completed. The pin thread 5 and the box thread 10 engage each other along the cooperating area 13. There is a radial thread interference 14 between the pin thread 5 and the box thread 10 along the complete cooperating area 13, similar as shown in FIG. 2. In an alternative embodiment of the threaded connection 1, the radial thread interference 14 is present along part of the cooperating area 13, similar as shown in FIG. 4.

The pin sealing surface 7 and the box sealing surface 12 are configured to contact each other upon make-up in a sealing manner while forming a metal to metal seal 15.

The pin taper angle α is larger than the box taper angle β. The pin thread 5 and the box thread 10 are the only threads provided on the pin member 3 and box member 8, respectively. The pin pitch diameter $D_1$ and box pitch diameter $D_2$ are indicated. Only some of the teeth of the pin and box threads 5 and 10 are shown.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the threaded tubular connection without departing from the scope as defined in the claims.

The invention claimed is:

1. A threaded tubular connection for use in the hydrocarbon industry comprising:
   a longitudinal axis,
   a pin member comprising a distal pin end, a tapered pin thread having a constant pin taper angle $α_1$ over the complete tapered pin thread and with respect to the longitudinal axis, and a pin sealing surface located between the pin thread and the distal pin end,
   a box member comprising a distal box end, a box sealing surface, and a tapered box thread having a constant box taper angle $β_1$ over the complete tapered pin thread and with respect to the longitudinal axis and located between the box sealing surface and the distal box end, and
   a cooperating area comprising an area of the tubular connection between a starting point of the pin thread and the box thread and an end point of the pin thread and the box thread, where the pin thread is made up with the box thread about a plurality of revolutions;
   wherein:
   the cooperating area comprises a radial thread interference between the pin thread and the box thread along at least two of the plurality of revolutions of the cooperating area,
   the pin thread is a pin wedge thread having pin teeth increasing in width in a first direction along the longitudinal axis, and the box thread is a box wedge thread having box teeth increasing in width in an opposite second direction along the longitudinal axis,
   each of the pin thread and the box thread has a dovetail-shaped thread profile,
   the pin sealing surface and the box sealing surface are configured to contact each other upon make-up in a sealing manner while forming a metal to metal seal, and
   the pin taper angle is larger than the box taper angle, such that the radial thread interference decreases gradually and continuously along at least two of the plurality of revolutions of the cooperating area in a direction toward the pin sealing surface and the box sealing surface.

2. The threaded tubular connection according to claim 1, wherein the pin thread has a diametrical pin taper, the box thread has a diametrical box taper, and the diametrical pin taper is between, and including, 0.0005 inch per revolution and 0.0015 inch per revolution larger than the diametrical box taper.

3. The threaded tubular connection according to claim 1, wherein at the end of make-up the pin thread and the box thread engage each other along the cooperating area and the radial thread interference between the pin thread and the box thread is present along the complete cooperating area.

4. The threaded tubular connection according to claim 1, wherein
   at the end of make-up the pin thread and the box thread engage each other along the cooperating area,
   the radial thread interference between the pin thread and the box thread is present along a first part of the cooperating area, there is a clearance between the pin thread and the box thread along a second part of the cooperating area, and the second part of the cooperating area is located closer to the pin sealing surface and the box sealing surface than the first part of the cooperating area.

5. The threaded tubular connection according to claim 1, wherein the pin thread and the box thread are the only threads provided on the pin member and the box member, respectively.

6. The threaded tubular connection according to claim 1, wherein the pin thread has a diametrical pin taper and the box thread has a diametrical box taper, and wherein;

the diametrical pin taper is between, and including, 0.014 inch per revolution and 0.090 inch per revolution, or the diametrical box taper is between, and including, 0.014 inch per revolution and 0.090 inch per revolution, or each of the diametrical pin taper and the diametrical box taper are between, and including, 0.014 inch per revolution and 0.090 inch per revolution.

7. The threaded tubular connection according to claim 1, wherein the metal to metal seal is a pressure energised seal.

8. The threaded tubular connection according to claim 1, wherein the metal to metal seal is an interference seal.

9. The threaded tubular connection according to claim 1, wherein the distal pin end of the pin member is free from contact with the box member in a direction along the longitudinal axis.

10. The threaded tubular connection according to claim 1, wherein the distal box end of the box member is free from contact with the pin member in a direction along the longitudinal axis.

11. The threaded tubular connection according to claim 1, wherein the pin thread and the box thread have less than 7 revolutions of thread.

12. The threaded tubular connection according to claim 1, wherein the further pin thread and the further box thread have less than 7 revolutions of thread.

13. The threaded tubular connection according to claim 1, wherein the radial thread interference is zero at an end of the cooperating area closest to the distal pin end.

14. The threaded tubular connection according to claim 1, wherein a clearance occurs at an end of the cooperating area closest to the distal pin end.

15. A threaded tubular connection for use in the hydrocarbon industry comprising:

a longitudinal axis, a pin member comprising a distal pin end, a tapered pin thread having a constant pin taper angle $\alpha_1$ with respect to the longitudinal axis, and a pin sealing surface located between the pin thread and the distal pin end, a box member comprising a distal box end, a box sealing surface, and a tapered box thread having a constant box taper angle $\beta_1$ with respect to the longitudinal axis and located between the box sealing surface and the distal box end, and a cooperating area comprising an area of the tubular connection between a starting point of the pin thread and the box thread and an end point of the pin thread and the box thread, where the pin thread is made up with the box thread about a plurality of revolutions, wherein the cooperating area having a radial thread interference between the pin thread and the box thread along at least two of the plurality of revolutions of the cooperating area, the pin sealing surface and the box sealing surface are configured to contact each other upon make-up in a sealing manner while forming a metal to metal seal, and the pin taper angle is larger than the box taper angle, such that the radial thread interference decreases gradually and continuously along at least two of the plurality of revolutions of the cooperating area in a direction toward the pin sealing surface and the box sealing surface, the pin member comprises a further tapered pin thread having a further constant pin taper angle $\alpha_2$ with respect to the longitudinal axis and located at a distance from the pin thread, the box member comprises a further tapered box thread having a further constant box taper angle $\beta_2$ with respect to the longitudinal axis and located at a distance from the box thread, a further cooperating area comprising an area of the tubular connection where the further pin thread is made up with the further box thread, wherein the further cooperating area having a further radial thread interference between the further pin thread and the further box thread along at least part of the further cooperating area, and the further pin taper angle is larger than the further box taper angle, such that the further radial thread interference decreases gradually and continuously along at least a part of the further cooperating area in a direction toward the pin sealing surface and the box sealing surface.

16. The tubular connection according to claim 15, wherein the pin thread is located closer to the distal pin end than the further pin thread, and the further box thread is located closer to the distal box end than the box thread, or the further pin thread is located closer to the distal pin end than the pin thread, and the box thread is located closer to the distal box end than the further box thread.

17. The threaded tubular connection according to claim 15, wherein each of the pin thread and the further pin thread is a pin wedge thread having pin teeth and further pin teeth, respectively, each of the pin teeth and the further pin teeth are increasing in width in a first direction along the longitudinal axis, each of the box thread and the further box thread is a box wedge thread having box teeth and further box teeth, respectively, and each of the box teeth and further box teeth are increasing in width in an opposite second direction along the longitudinal axis.

18. The threaded tubular connection according to claim 15, wherein each of the pin thread, the further pin thread, the box thread and the further box thread has a dovetail-shaped thread profile.

19. The threaded tubular connection according to claim 15, wherein the pin thread has a diametrical pin taper and the box thread has a diametrical box taper, and wherein;

the diametrical pin taper is between, and including, 0.014 inch per revolution and 0.090 inch per revolution, or the diametrical box taper is between, and including, 0.014 inch per revolution and 0.090 inch per revolution, or each of the diametrical pin taper and the diametrical box taper are between, and including, 0.014 inch per revolution and 0.090 inch per revolution.

20. The threaded tubular connection according to claim 15, wherein the pin thread and the box thread have less than 7 revolutions of thread.

21. The threaded tubular connection according to claim 15, wherein the further pin thread and the further box thread have less than 7 revolutions of thread.

22. A tubular connection for use in the hydrocarbon industry comprising:
a longitudinal axis,
a pin member comprising a distal pin end, a tapered pin thread having a constant pin taper angle $\alpha_1$ with respect to the longitudinal axis, and a pin sealing surface located between the pin thread and the distal pin end,
a box member comprising a distal box end, a box sealing surface, and a tapered box thread having a constant box taper angle $\beta_1$ with respect to the longitudinal axis and located between the box sealing surface and the distal box end, and
a cooperating area comprising an area of the tubular connection between a starting point of the pin thread and the box thread and an end point of the pin thread and the box thread, where the pin thread is made up with the box thread about a plurality of revolutions, wherein
the cooperating area having a radial thread interference between the pin thread and the box thread along at least two of the plurality of revolutions of the cooperating area,
the pin sealing surface and the box sealing surface are configured to contact each other upon make-up in a sealing manner while forming a metal to metal seal, and
the pin taper angle is larger than the box taper angle, such that the radial thread interference decreases gradually and continuously along at least two of the plurality of revolutions of the cooperating area in a direction toward the pin sealing surface and the box sealing surface,
the pin member comprises a further tapered pin thread having a further constant pin taper angle $\alpha_2$ with respect to the longitudinal axis and located at a distance from the pin thread,
the pin member is provided with a further pin sealing surface located between the further pin thread and the distal pin end,
the box member comprises a further tapered box thread having a further constant box taper angle $\beta_2$ with respect to the longitudinal axis and located at a distance from the box thread,
the box member is provided with a further box sealing surface,
the further box thread is located between the further box sealing surface and the distal box end,
a further cooperating area comprising an area of the tubular connection where the further pin thread is made up with the further box thread, wherein
the further cooperating area having a further radial thread interference between the further pin thread and the further box thread along at least part of the further cooperating area,
the further pin sealing surface and the further box sealing surface are configured to contact each other upon make up in a sealing manner while forming a further metal to metal seal, and
the further pin taper angle is larger than the further box taper angle, such that the further radial thread interference decreases gradually and continuously along at least a part of the further cooperating area in a direction toward the pin sealing surface and the box sealing surface.

23. The threaded tubular connection according to claim 22, wherein
the pin thread and the pin sealing surface are located closer to the distal pin end than the further pin thread and the further pin sealing surface, and the further box thread and the further box sealing surface are located closer to the distal box end than the box thread and the box sealing surface, or
the further pin thread and the further pin sealing surface are located closer to the distal pin end than the pin thread and the pin sealing surface, and the box thread and the box sealing surface are located closer to the distal box end than the further box thread and the further box sealing surface.

24. The threaded tubular connection according to claim 22, wherein the further metal to metal seal is a pressure energised seal.

25. The threaded tubular connection according to claim 22, wherein the further metal to metal seal is an interference seal.

26. The threaded tubular connection according to claim 22, wherein
each of the pin thread and the further pin thread is a pin wedge thread having pin teeth and further pin teeth, respectively,
each of the pin teeth and the further pin teeth are increasing in width in a first direction along the longitudinal axis,
each of the box thread and the further box thread is a box wedge thread having box teeth and further box teeth, respectively, and
each of the box teeth and further box teeth are increasing in width in an opposite second direction along the longitudinal axis.

27. The threaded tubular connection according to claim 22, wherein the pin thread has a diametrical pin taper and the box thread has a diametrical box taper, and wherein;
the diametrical pin taper is between, and including, 0.014 inch per revolution and 0.090 inch per revolution, or
the diametrical box taper is between, and including, 0.014 inch per revolution and 0.090 inch per revolution, or
each of the diametrical pin taper and the diametrical box taper are between, and including, 0.014 inch per revolution and 0.090 inch per revolution.

28. The threaded tubular connection according to claim 22, wherein the pin thread and the box thread have less than 7 revolutions of thread.

29. The threaded tubular connection according to claim 22, wherein the further pin thread and the further box thread have less than 7 revolutions of thread.

30. The threaded tubular connection according to claim 22, wherein each of the pin thread, the further pin thread, the box thread and the further box thread has a dovetail-shaped thread profile.

31. A threaded tubular connection for use in the hydrocarbon industry comprising:
a longitudinal axis,
a pin member comprising a distal pin end, a tapered pin thread having a constant pin taper angle $\alpha_1$ with respect to the longitudinal axis, and a pin sealing surface located between the pin thread and the distal pin end,
a box member comprising a distal box end, a box sealing surface, and a tapered box thread having a constant box taper angle $\beta_1$ with respect to the longitudinal axis and located between the box sealing surface and the distal box end, and a cooperating area comprising an area of the tubular connection between a starting point of the pin thread and the box thread and an end point of the pin thread and the box thread, where the pin thread is made up with the box thread about a plurality of revolutions, wherein the cooperating area comprising a radial thread interference between the pin thread and the box thread along at least two of the plurality of revolutions of the cooperating area, the pin sealing surface and the box sealing surface are configured to contact each other upon make-up in a sealing manner while forming a metal to metal seal, and the pin taper angle is larger than the box taper angle, such that the radial thread interference decreases gradually and continuously along at least two of the plurality of revolutions of the cooperating area in a direction toward the pin sealing surface and the box sealing surface, wherein the pin member comprises a further tapered pin thread having a further constant pin taper angle $\alpha_2$ with respect to the longitudinal axis and located at a distance from the pin thread, the box member comprises a further tapered box thread having a further constant box taper angle $\beta_2$ with respect to the longitudinal axis and located at a distance from the box thread, a further cooperating area comprising an area of the tubular connection where the further pin thread is made up with the further box thread, wherein the further cooperating area having a further radial thread interference between the further pin thread and the further box thread along at least part of the further cooperating area, and the further pin taper angle is equal to the further box taper angle.

32. The threaded tubular connection according to claim 31, wherein
each of the pin thread and the further pin thread is a pin wedge thread having pin teeth and further pin teeth, respectively,
each of the pin teeth and the further pin teeth are increasing in width in a first direction along the longitudinal axis,
each of the box thread and the further box thread is a box wedge thread having box teeth and further box teeth, respectively, and
each of the box teeth and further box teeth are increasing in width in an opposite second direction along the longitudinal axis.

33. The threaded tubular connection according to claim 31, wherein each of the pin thread, the further pin thread, the box thread and the further box thread has a dovetail-shaped thread profile.

34. A tubular connection for use in the hydrocarbon industry comprising:
a longitudinal axis,
a pin member comprising a distal pin end, a tapered pin thread having a constant pin taper angle $\alpha_1$ with respect to the longitudinal axis, and a pin sealing surface located between the pin thread and the distal pin end,
a box member comprising a distal box end, a box sealing surface, and a tapered box thread having a constant box taper angle $\beta_1$ with respect to the longitudinal axis and located between the box sealing surface and the distal box end, and a cooperating area comprising an area of the tubular connection between a starting point of the pin thread and the box thread and an end point of the pin thread and the box thread, where the pin thread is made up with the box thread about a plurality of revolutions, wherein the cooperating area comprises a radial thread interference between the pin thread and the box thread along at least two of the plurality of revolutions of the cooperating area, the pin sealing surface and the box sealing surface are configured to contact each other upon make-up in a sealing manner while forming a metal to metal seal, and the pin taper angle is larger than the box taper angle, such that the radial thread interference decreases gradually and continuously along at least two of the plurality of revolutions of the cooperating area in a direction toward the pin sealing surface and the box sealing surface, wherein the pin member comprises a further tapered pin thread having a further constant pin taper angle $\alpha_2$ with respect to the longitudinal axis and located at a distance from the pin thread, the pin member is provided with a further pin sealing surface located between the further pin thread and the distal pin end, the box member comprises a further tapered box thread having a further constant box taper angle $\beta_2$ with respect to the longitudinal axis and located at a distance from the box thread, the box member is provided with a further box sealing surface, the further box thread is located between the further box sealing surface and the distal box end, a further cooperating area comprising an area of the tubular connection where the further pin thread is made up with the further box thread, wherein the further cooperating area having a further radial thread interference between the further pin thread and the further box thread along at least part of the further cooperating area, the further pin sealing surface and the further box sealing surface are configured to contact each other upon make up in a sealing manner while forming a further metal to metal seal, and the pin taper angle is equal to the further box taper angle.

35. The threaded tubular connection according to claim 34, wherein
each of the pin thread and the further pin thread is a pin wedge thread having pin teeth and further pin teeth, respectively,
each of the pin teeth and the further pin teeth are increasing in width in a first direction along the longitudinal axis,
each of the box thread and the further box thread is a box wedge thread having box teeth and further box teeth, respectively, and
each of the box teeth and further box teeth are increasing in width in an opposite second direction along the longitudinal axis.

36. The threaded tubular connection according to claim 34, wherein each of the pin thread, the further pin thread, the box thread and the further box thread has a dovetail-shaped thread profile.

* * * * *